United States Patent [19]

Springer

[11] 4,305,142
[45] Dec. 8, 1981

[54] BALLISTIC IMPACT SENSING AND DISPLAY SYSTEM

[76] Inventor: Barry R. Springer, 9380 Saddlemount Ct., Springfield, Va. 22153

[21] Appl. No.: 113,399

[22] Filed: Jan. 18, 1980

[51] Int. Cl.³ .................................................. G01S 5/18
[52] U.S. Cl. ..................................... 367/127; 273/372; 367/906
[58] Field of Search ................. 273/372; 367/111, 117, 367/127, 906, 907, 125

[56] References Cited

U.S. PATENT DOCUMENTS

| | | | |
|---|---|---|---|
| 2,934,346 | 4/1960 | Mongello | 273/372 |
| 3,707,699 | 12/1972 | Sanctuary | 367/127 |
| 3,778,059 | 12/1973 | Rohrbaugh et al. | 367/906 |

Primary Examiner—Richard A. Farley

[57] ABSTRACT

An improved ballistic impact sensing and display system is provided for use in conjunction with land or water ordnance ranges. A plurality of sensors placed around the target area detect the shock wave created by the impact or passage of the ballistic projectile. The sensors drive electronic timing means which record the time intervals between activation of the sensors by the propagating shock wave. Storage registers within the timing means drive a gridwork of display buses arranged along hyperbolic curves. A matrix of indicators bridging the points of intersection of the hyperbolic buses display the compartment within the target area in which the impact occurred. Additional indicators around the periphery of the matrix of indicators display the sector by which a projectile passed if it missed the target area.

10 Claims, 4 Drawing Figures

BALLISTIC IMPACT SENSING AND DISPLAY SYSTEM

BACKGROUND OF THE INVENTION

Several techniques are known for detecting the impact of a ballistic projectile and for remotely indicating the point of impact. The following U.S. Patents are hereby referenced as being typical of the known prior art relevant to the present invention: Nos.

2,934,346: Mongello
2,916,289: Zito
2,973,964: Zito
3,022,076: Zito
3,627,323: Bozich et al.
3,678,495: Gilbert
3,707,699: Sanctuary
3,778,059: Rohrbaugh et al.

The referenced prior art provides a variety of methods for detecting and displaying ballistic impact events. These prior art systems, however, each have drawbacks relating to their complexity, accuracy, or maintenance requirements. Specifically, the systems disclosed by Bozich and Gilbert require a large number of sensors to maintain reasonable accuracy of impact location across the target area. The Zito system uses only three sensors, however, it incorporates a complex electromechanical plotter to display the impact location. The Rohrbaugh system utilizes linear transducers which restricts its versatility in adapting to varied target area sizes, especially where very large target areas are involved. The Mongello system incorporates an orthogonal matrix of indicators to display the impact location; however, it requires a corresponding matrix of orthogonal sensor straps to detect the impact location. The straps limit the adaptability of the system, and require continued maintenance.

OBJECTS OF THE INVENTION

Being thus aware of the limitations of the systems provided in the prior art, it is therefore an object of the present invention to provide an improved ballistic impact sensing and display system which is simple, maintenance free, and which provides a direct visual indication of the impact point relative to the location of the impact sensors.

It is a further object of the present invention to provide an impact display system which is uniformly accurate across the target area.

It is a further object of the present invention to provide a visual indication of the sector by which a projectile passed the target if it missed the target area.

It is a further object of the present invention to provide a ballistic impact sensing and display system which is readily adaptable to a wide variety of target sizes and sensing mediums.

SUMMARY OF THE INVENTION

A plurality of sensors located about the target area detect the impact of a ballistic projectile by generating electrical signals in response to the passage of the shock wave propagating radially outward from the point of impact. Each sensor signal is amplified, filtered, level detected, and latched to provide parallel digital signals with a single leading state transition corresponding in time to the passage of the leading edge of the propagating shock wave past the associated sensor. The digital sensor signals are gated with a clock signal, the frequency of which is proportional to the speed of propagation of the shock wave in the impact medium. The gating is terminated when the shock wave has passed all sensors. The resulting gated clock bursts are are counted by a plurality of counters which in turn drive families of display buses arranged along hyperbolic curved lines. Indicators bridging the intersection points between display buses provide the means of visual indication of the impact point compartment within the display plane. Additional indicators, activated upon the counters reaching a preset counting limit, provide a visual indication of the sector by which target area missed projectile passed the target area.

DESCRIPTION OF THE PREFERRED EMBODIMENT

The present invention is based on the principle that a ballistic projectile traveling at supersonic speed creates a shock wave which propagates uniformly and radially outward from the projectiles path of flight; and on the principle that a ballistic projectile, whether subsonic or supersonic, upon impacting a target, creates a shock wave which propagates uniformly and radially outward from the impact point within the target medium. Sensors located within the target plane detect the passage of the shock wave. Recording the time differential between activation of the sensors permits location of the impact point to be reconstructed by the use of lines of constant time difference among the sensors.

Figure 1:
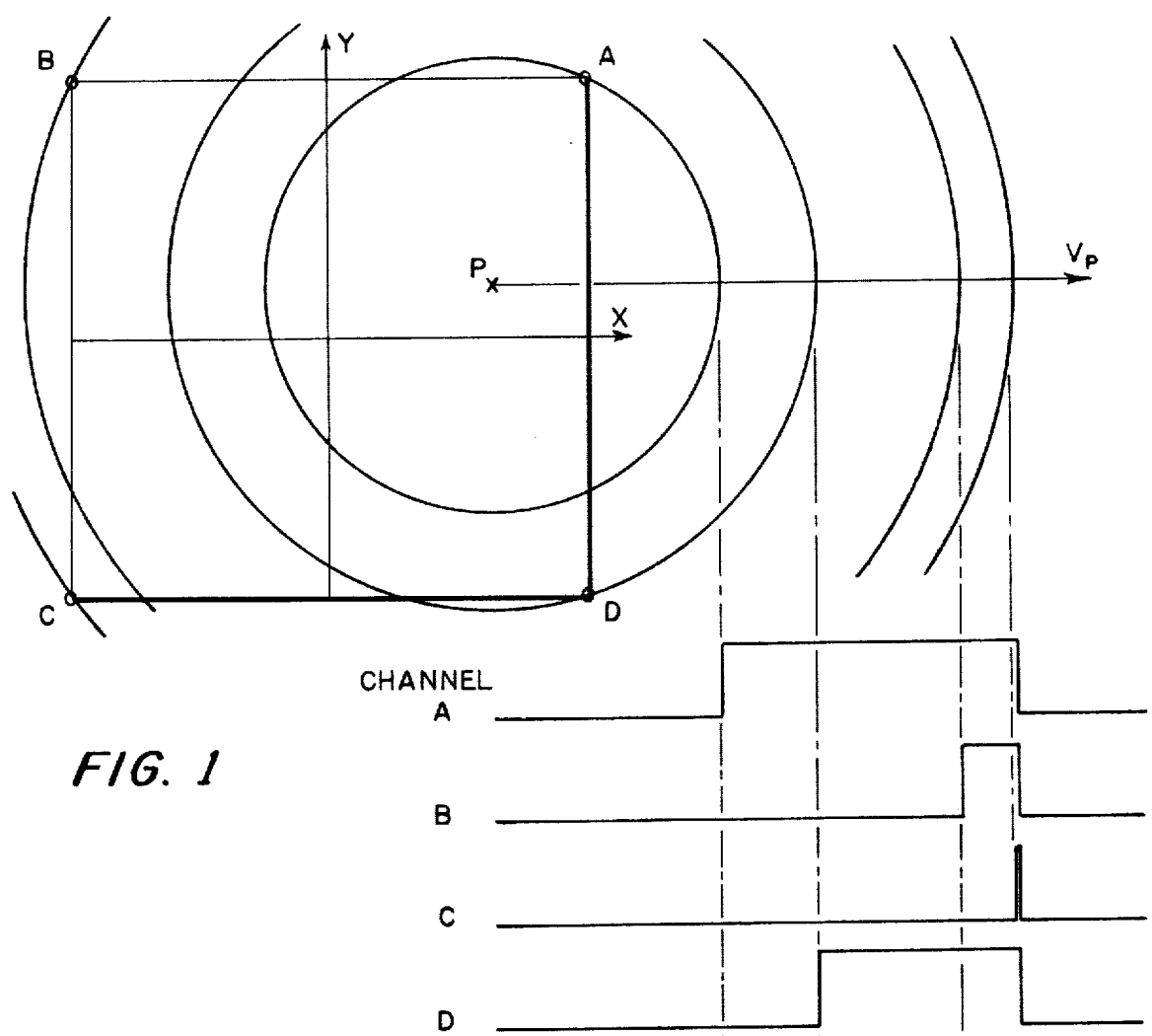
FIG. 1 depicts a ballistic impact in the target plane and the resulting propagating wave with sensor activation sequence.

FIG. 1 depicts such a target impact situation with four sensors designated A, B, C, and D located symmetrically about the target within the X-Y plane. A ballistic projectile impacting at a point, designated P, creates a shock wave within the target plane which propagates radially outward at velocity $V_p$. Each sensor responds to the passage of the shock wave by generating electrical signals which are subsequently processed to produce a digital signal transition coincident with the passage of the leading edge of the shock wave past the associated sensor within the target plane. The exact time of projectile impact is not immediately known; however, the differential time of arrival of the shock wave at the sensors is known. Referring to FIG. 1. Sensor A detects the shock wave first, followed next by sensor D. Since sensors A and D are vertically separated within the target plane, the time differential between their activation by the shock wave is designated as Delta-Ty. It is therefore known that the impact occurred at some location within the target plane such that the difference in propagation times from point P to A and P to D was Delta-Ty. Such a location determination is not yet exact since there is a family of points, described mathematically as a pair of hyperbolic curves, which satisfy the single time differential condition. Since sensor A was activated first, the lower limb of the curve pair can be discarded as a solution. It is therefore known, that the impact occurred along the upper limb of a hyperbolic curve of constant difference Delta-Ty with focii at the locations of sensors A and D.

Similarly, the time differential between the activation of sensors A and B will yield the conclusion that the impact occurred along the right limb of a hyperbolic curve of constant difference Delta-Tx with focii at the locations of sensors A and B. The two hyperbolic curves will intersect uniquely within the sensor quadrant A. The intersection of the two hyperbolic curves will identify the point of impact within the quantization limits of the hyperbolic curve separations determined by the smallest clock interval used to record Delta-Tx and Delta-Ty.

Figure 2:
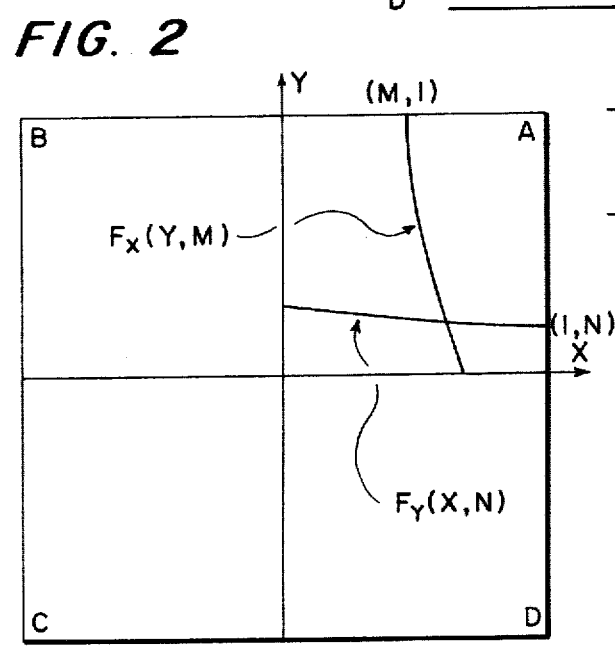
FIG. 2 depicts the mathematical reconstruction of the target impact point in the display plane using intersecting hyperbolic curves.

FIG. 2 depicts the mathematical reconstruction of the above described point of impact within the display plane. The display plane is also an X-Y coordinate plane, however the sensor locations are scaled to $(X,Y) = (\pm 1, \pm 1)$. Using the example impact of FIG. 1, the time difference between sensor A and sensor D impact was Delta-Ty. If the sensors are located at $(X,Y) = (\pm L, \pm L)$ in the target plane and the shock wave propagates at velocity Vp; then the intersection of the hyperbolic curve with the line of A-D focii will be at $(X,Y) = (1,N)$ where N is defined by: $N = (Vp*DeltaTy)/(2*L)$. The intersection of the curve with the line of focii determines the shape of the hyperbolic curve. This hyperbolic curve is designated Fy(X,N) and defined by:

$$Fy(X,N) = N*(1 + ((X-1)^2/(1-N^2)))^{(0.5)}.$$

Similarly, Delta-Tx being the difference between activation of sensors A and B, will result in the hyperbolic curve intersecting the line of A-B focii at (M,1), where M is defined by $M = (Vp*DeltaTx)/(2*L)$. The hyperbolic curve is then defined by:

$$Fx(Y,M) = M*(1 + ((Y-1)^2/(1-M^2)))^{(0.5)}.$$

It will be noted that although sensor C output signal was also received, it was not utilized in the computation of the location of impact. This occurrs because, unlike prior art systems which utilize four sensors strictly as two pairs of diametrically oppossed sensors, the present invention allows the flexible linking of the four sensors as four pairs of sensors. The exact configuration of sensors used in any instance of impact detection depends upon which sensor was activated first. The two sensors nearest the first activated sensor are used in the location processing, and the sensor farthest from the first activated sensor is used only to trigger a reset operation to prepare the system for the next impact event. The result of this unique flexible linking technique is the resulting display geometry which closely approximates the generally circular nature of most ballistic impact target areas.

Figure 3:
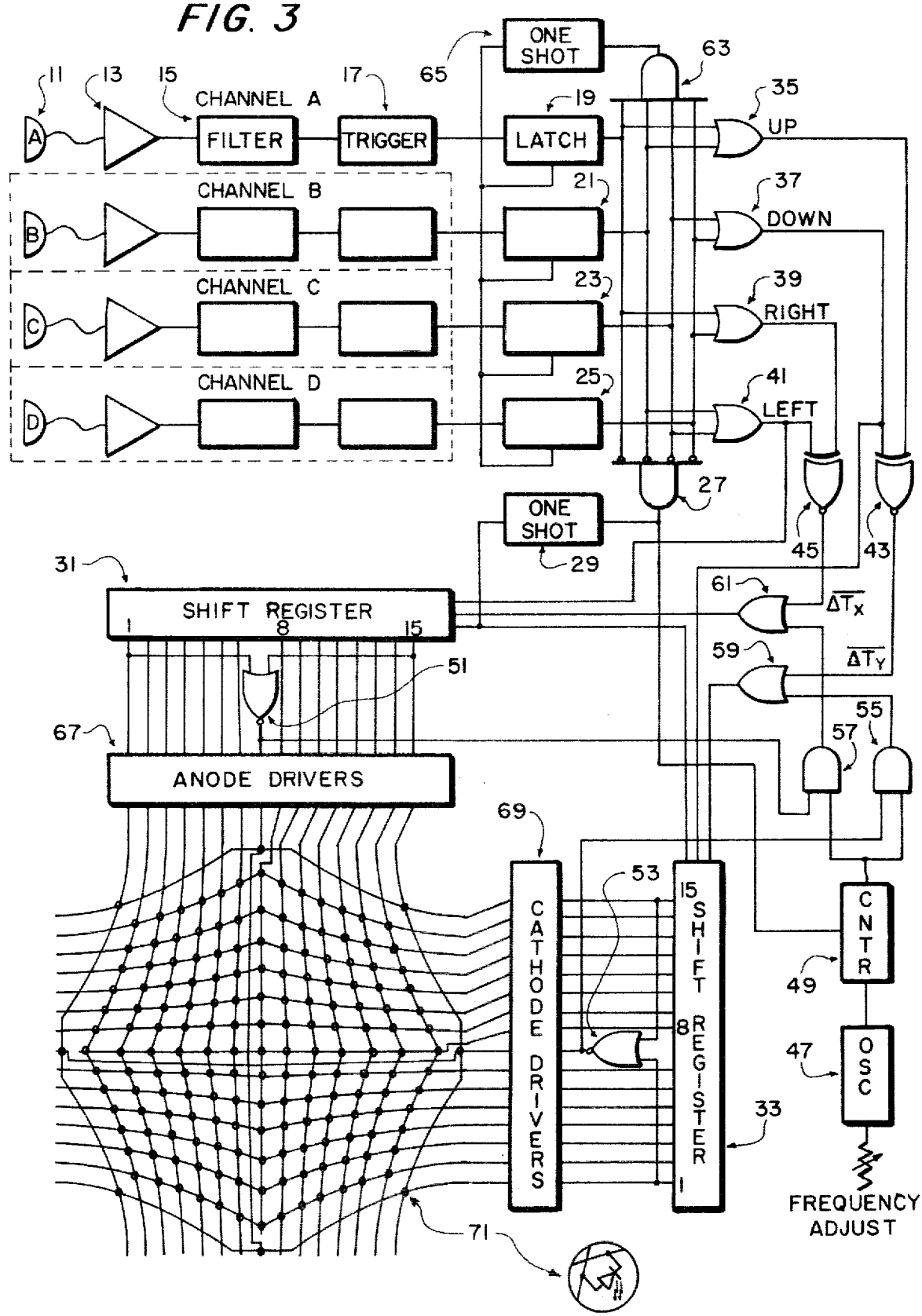
FIG. 3 is a logic diagram of the preferred embodiment of the invention.

FIG. 3 is a logic diagram of a system suitable to practice the present invention. Signals from a sensor 11, generated in response to the passage of shock wave, are amplified by amplifier 13 and filtered by filter 15. The characteristics of filter 15 are chosen to be of a high pass nature to accentuate the leading edge of the sensor signal. This reduces the detection delay and thus improves the accuracy of the location determining process. The output of filter 15 drives a threshhold detector or trigger 17 which generates an output signal when a predetermined threshhold level has been exceeded. The threshhold level is set sufficiently high to prevent random noise from triggering an output. Trigger 17 output serves as a clocking signal to latch D-type flip-flop 19 to an output high state. A latch is necessary because the nature of the shock wave passing the sensors is a damped oscillation. Only the leading edge of the shock wave is of intrest in determining the impact location. The latch prevents the system from reacting to successive wave peaks that will strike the sensor as the shock wave ripples past.

The preceeding description of Channel A signal processing is repeated identically in Channels B, C, and D with the processed sensor signals latching in latches 21, 23, and 25 respectively. When an impact event occurs and the output of one of the latches goes to logic high state, AND gate 27 will no longer be satisfied and its output will go to logic low level. This will in turn cause One-Shot Mulitvibrator 29 to generate a short duration pulse which will parallel load bi-directional shift registers 31 and 33 with bit pattern of 1 in bit location 8, and 0 in all other bit locations. Bit 8 corresponds to origin of the X and Y axes in registers 33 and 31 respectively. The registers are therefore preset to mathematical equivalent states of N=0, M=0.

As described previously, the processing technique utilized in the present invention allows the four sensors to be linked as four pairs of sensors to improve the accuracy and the fromat of the display. OR gates 35,37,39, and 41 perform this linking function. Gate 35 senses channels A and B through latches 19 and 21 to indicate sensor response above the X axis; gate 37 senses channels C and D through latches 23 and 25 to indicate sensor response below the X axis; gate 39 senses channels A and D through latches 19 and 25 to indicate sensor response to the right of the Y axis; and gate 41 senses channels B and C through latches 21 and 23 to indicate sensor response to the left of the Y axis. The responses of gates 35, 37, 39 and 41 are designated UP, DOWN, RIGHT, and LEFT. The UP and DOWN response signals are sensed by EXCLUSIVE-NOR gate 43 which generates a logic low signal between receipt of an UP or DOWN signal and receipt of both signals. The output of gate 43 therefore represents the inverse of the Delta-Ty signal as shown in FIG. 1. Similarly, EXCLUSIVE-NOR gate 45 generates a logic low signal between receipt of a RIGHT of LEFT signal and receipt of both signals. Gate 45 output represents the inverse of the Delta-Tx signal shown in FIG. 1.

The generation of the discrete M and N values for the display drivers requires that the Delta-Tx and Delta-Ty signals be combined with a clock signal to generate discrete shift pulses for the shift registers 31 and 33 to position the active bit, previously preset to bit location 8, to the appropriate M and N value locations.

The base clock frequency is generated by variable frequency oscillator 47. As shown in FIG. 3, the preferred display includes 15 increments in each axis. The second and fourteenth increments are selected with line of focii crossings of 0.552 times the distance off axis at which the sensors are located. Designating the sensors to be located L distance off axis in the target plane; the 6 increments of the shift register 31 or 33, from the eighth to the fourteenth bit locations, corresponds to M or N values of 0.552. Each of the 6 register shifts must occur with a time difference of:

$T = (0.552/6)*(2*L/V_p)$ or $T = 0.092*L/V_p$

Assuming that the sensors were located 1 meter off axis, $L=1$; and the sensing medium were air at sea level at 25 degrees Celcius, then the velocity of the radial shock wave propagation would be 346 meters per second, and required clock frequency would be $F=1/T=(346/0.092)=1.88$ Khz. The clock must also be synchronized to the start of DeltaTx and DeltaTy and offset by one half clock period to cause the first register shift to occur at the equivalent of the half incremental bit shift point so that each incremental bit will represent the centerpoint of the location of the impact compartment and not the edge or start of the compartment.

Synchronization and offset is accomplished by asynchronously loadable four bit binary counter 49. The output of gate 27, which is high until the first sensor is activated, holds counter 49 in a preset eight count. When the first sensor is activated and gate 27 output drops to logic low, counter 49 is permitted to count from the preset eight count. The output of counter 49 is therefore synchronized to the start of DeltaTx and DeltaTy within one sixteenth of a clock period, and is offset by one half of a clock period. The synchronizing and offsetting process requires a divide by sixteen counter, therefore, the base frequency must be selected to be sixteen times higher than previously computed. For the example figures used, the clock frequency required is: $F=16*1.88$ KHz$=30.1$ Khz.

At the start of DeltaT timing periods, shift registers 31 and 33 were preset with only bit position 8 high. NOR gates 51 and 53 will therefore both output logic high states thus enabling AND gates 55 and 57 and passing the clock signal to OR gates 59 and 61. Gates 59 and 61 also receive the DeltaTx and DeltaTy signals from gates 43 and 45 respectively. The gated clock signal from from gate 59 is sensed by shift register 33 to cause the register to shift one bit per clock pulse during the gated DeltaTy period. The direction of shift is determined by an input from gate 37. If the DOWN signal is present during the gated DeltaTy time period, the register will shift down with each clock pulse. Absence of the DOWN signal will cause the register to shift up with each clock pulse. If the actual impact were so high or so low as to allow the shift register to shift to the fifteenth or first bit position high, then gate 53 output would drop to logic low, disabling gate 55, and terminating the shifting process.

In a similar manner, the gated clock signal from gate 61 is sensed by shift register 31 to cause the register to shift one bit per clock pulse during the DeltaTx time period. The direction of shift is determined by an input from gate 41. If the LEFT signal is present during the shifting period, the register will shift left with each clock pulse. Absence of the LEFT signal will cause the register to shift right with each clock pulse. If the actual impact were so far to the left or right as to allow the register to shift to the fifteenth or first bit position high, gate 51 output would drop to logic low state, disabling gate 57, and terminating the shifting process.

When the DeltaTx and DeltaTy time periods are concluded, the next event to occur will be the activation of the fourth sensor. When thes occurs, all four latches will be latched to logic high and AND gate 63 will be satisfied. The rising output level of gate 63 will trigger One-Shot Multivibrator 65 to generate a reset pulse of duration Tr. The duration of Tr must be sufficiently long to prevent the system from retriggering on any secondary shock waves, echoes, reverberations and the like. Upon termination of reset pulse Tr, the system will be active and ready for another impact count cycle.

At the completion of the register shifting, registers 31 and 33 will contain the hyperbolic M and N coordinates of the ballistic impact location. The output lines from register 31 are used to drive a group of 16 anode drivers; 15 directly and 1 through gate 51. The output lines from register 33 are used to drive a group of 16 cathode drivers; 15 directly and 1 through gate 53.

The anode drivers 67 drive a family of hyperbolic bus lines aligned according to equation $Fy(X,N)$ in the first quadrant with symmetrical reflection about the X and Y axes for the other three quadrants. Similarly, cathode drivers 69 drive a family of hyperbolic bus lines aligned according to equation $Fx(Y,M)$ in the first quadrant with symmetrical reflection about the X and Y axes for the other three quadrants. At all X and Y bus intersections shown circled in FIG. 3, a light emitting diode (LED) 71 bridges the intersection with the anode side connected to the X hyperbolic bus line and the cathode connected to the Y hyperbolic bus line. As only one bit was preset in each shift register and then shifted according to the timing experienced among activation of the sensors, only one anode driver and one cathode driver will be driven by the shift registers. The single LED bridging the intersection of the two actively driven bus lines will be illuminated. This LED will indicate the discrete impact compartment in which the impact occurred or the sector by which the projectile passed if either the X or Y bus line active is the first or fifteenth line. The off target indicator LED's may be selected to emit a different color light from the target compartment LED's to further enhance the distinction in purpose of the two.

The system may be increased in precision by increasing the number of stages in each shift register thus producing proportionally smaller impact quantization areas. The number of off target indicators may also be increased up to four times the number of combined bits in the X and Y shift registers.

The system may be utilized to detect and display any type of event which creates a uniformly propagating disturbance or general energy wave. Sensors for such application must be selected for the application involved. Such sensors may include gaseous medium sensors such as microphones, liquid medium sensors such as hydrophones, solid medium sensors such as geophones, and like sensors particularly adapted to other mediums. In all such applications, the base clock frequency must be set according to the separation distance of the sensors and the speed of propagation of the wave front of the wave or distrubance in the sensing medium according to the equations for clock frequency presented herein.

Figure 4:
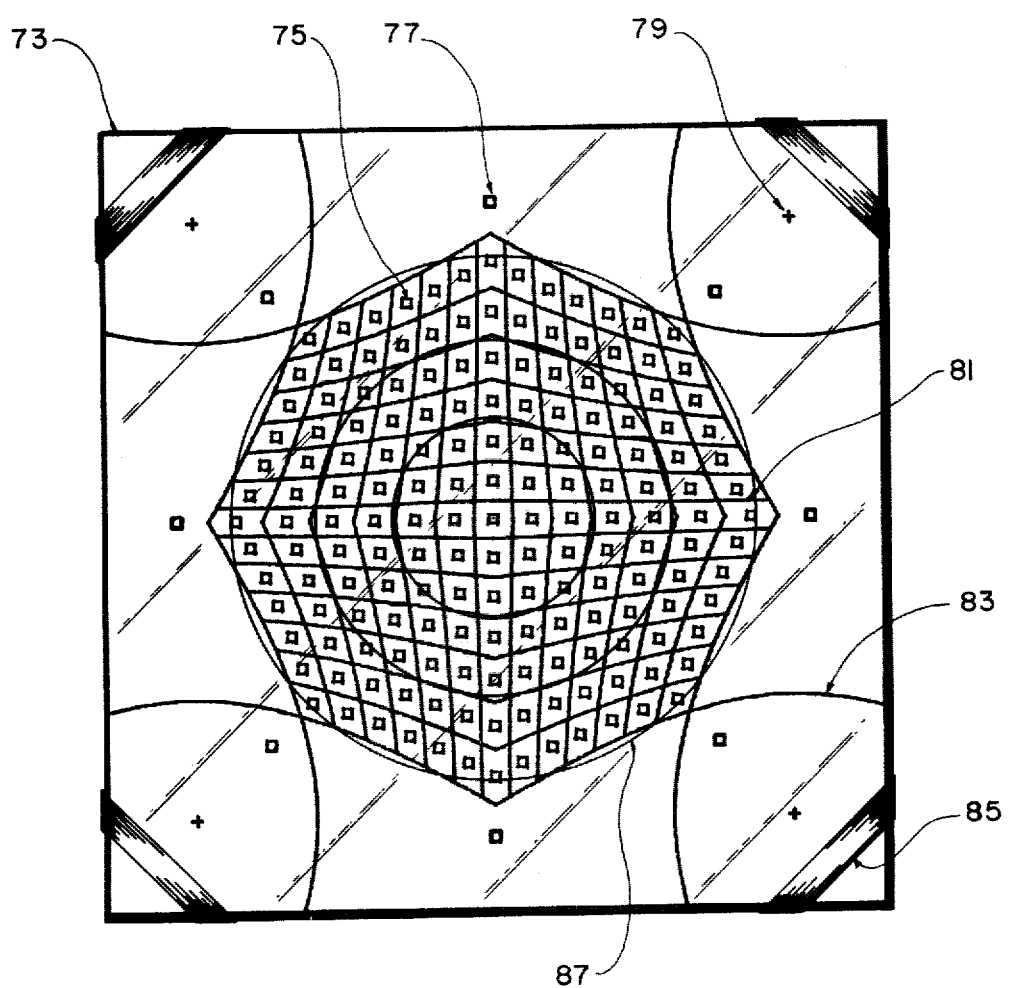
FIG. 4 depicts the display plane and shows impact area quantization compartments and target area miss sectors.

FIG. 4 depicts the format of the display. The basic display plane structure 73 may be comprised of a sheet of metal, plastic, plywood or other suitable material of sufficient thickness and strength for its size to be observably rigid. One hundred and sixty-nine target impact LED's 75 and eight off target sector LED's 77 are flush recessed into the display board. These LED's are located in the display plane relative to the facsimile locations 79 of the target plane sensors according to the intersections of the display buses previously described. Imprinted upon the display board are impact quantization compartment definition lines 81 and off target sector definition lines 83. Overlay retaining straps 85 are affixed to the edges of the display board to permit target overlays to be firmly retained against the display board. Such overlays may be semi-transparent and imprinted with a facsimile of the target, scoring circles, maps of gunnery target areas and the like. The display indicator LED's will then backlight the overlay with the impact location or miss sector.

The impact sensing and display system provided herein is intended to be highly versatile and readily useable in a wide variety of ballistic impact and general wave disturbance location and display applications beyond the pistol range, rifle range, and land or sea rocket or artillery ranges. It is intended that such additional applications as the skilled practitioner in the use of this system may adopt are within the spirit and scope of the invention provided herein. It is also understood that the preceeding descriptions and drawings of the preferred embodiment include numerical values by way of example only, and that these values are not intended to limit the scope of the invention. Other numerical values may also be used and still remain within the scope of the invention.

I claim:

1. A method for determining and remotely indicating the location of a source of energy in a defined area comprising:

sensing the arrival of energy at a minimum of three energy sensors;

determining a first time difference between the sensing of energy at two sensors;

determining a second time difference between the sensing of energy at two sensors, at least one of which is other than either of the two sensors used to determine said first time difference;

remotely indicating the location of the energy source by a matrix of indicators selectively activated according to said first and second time differences and positioned substantially at the intersections of two families of hyperbolic curves; the foci of the first family of hyperbolic curves corresponding to the locations of the sensors which determined said first time difference; and the foci of the second family of hyperbolic curves corresponding to the locations of the sensors which determined said second time difference.

2. A method as described in claim 1 including remotely indicating the relative azimuth of the energy source by an array of indicators selectively activated according to said first and second time differences when the location of the energy source is beyond the limits of indication of said matrix of indicators.

3. A system for determining and remotely indicating the impact location of a projectile in a defined target area, responsive to the primary shock wave created by impact of the projectile upon the target or supersonic passage of the projectile through the target plane, comprised of:

first, second, third, and fourth accoustic sensors located in sequence around the target area, generating signals in response to the arrival of the primary shock wave;

first logic means receiving signals from said sensors and generating a first time difference signal between receipt of a signal from either said first or fourth sensor and receipt of a signal from either said second or third sensor;

second logic means receiving signals from said sensors and generating a second time difference signal between receipt of a signal from either said first or second sensor and receipt of a signal from either said third or fourth sensor;

a clock signal generator;

first counter receiving signals from said first logic means and said clock signal generator, and counting clock cycles during said first time difference signal period;

second counter receiving signals from said second logic means and said clock signal generator, and counting clock cycles during said second time difference signal period;

first indicator driver receiving a count form said first counter and selectively activating a plurality of indicator drive buses;

second indicator driver receiving a count from said second counter and selectively activating a plurality of indicator drive buses;

a plurality of indicators, each of which is coupled to a single first indicator driver bus and a single second indicator driver bus and is responsive to simultaneous activation of the two buses to which the indicator is coupled.

4. The system described in claim 3 including means to adjust the frequency of said clock signal generator as required for various shock wave propagation velocities and sensor spacings.

5. The system described in claim 4 including positioning said plurality of indicators in a planar array and aligning said indicators along hyperbolic lines in both axes of the array, the foci of said hyperbolic lines corresponding to the relative locations of the sensors surrounding the target area.

6. The system described in claim 5 including means to terminate counting by said first counter upon reaching a specified count, and means to terminate counting by said second counter upon reaching a specified count.

7. The system described in claim 6 including logic means interposed between said first counter and said said first indicator driver, and logic means interposed between said second counter and said second indicator driver such that the outermost indicators of said array of indicators indicates the relative azimuth of target area impacts or passage beyond the limit of location indication of the array.

8. The system described in claim 5 including means to amplify, filter, threshhold detect and latch signals from each of the sensors prior to such signals reaching said first and second logic means.

9. The system described in claim 5 including an indicator panel within which said indicators are mounted, and means to attach graphic works, including scoring areas, target area maps, and the like, to the indicator panel such that said indicators indicate the point of impact on the graphic works.

10. The system described in claim 8 including means to automatically reset said first and second counters prior to starting a countup sequence and means to automatically reset said latches at a predetermined time after the shock wave has passed all sensors.

* * * * *